(12) United States Patent
Eisenwinter

(10) Patent No.: US 10,919,146 B2
(45) Date of Patent: Feb. 16, 2021

(54) ROBOT ARM COMPRISING A MECHANICAL STOP DEVICE

(71) Applicant: KUKA Deutschland GmbH, Augsburg (DE)

(72) Inventor: Leander Eisenwinter, Buttenwiesen/Lauterbach (DE)

(73) Assignee: KUKA Deutschland GmbH, Augsburg (DE)

( * ) Notice: Subject to any disclaimer, the term of this patent is extended or adjusted under 35 U.S.C. 154(b) by 58 days.

(21) Appl. No.: 16/491,075

(22) PCT Filed: Mar. 6, 2018

(86) PCT No.: PCT/EP2018/055489
§ 371 (c)(1),
(2) Date: Sep. 4, 2019

(87) PCT Pub. No.: WO2018/162492
PCT Pub. Date: Sep. 13, 2018

(65) Prior Publication Data
US 2020/0009723 A1  Jan. 9, 2020

(30) Foreign Application Priority Data
Mar. 7, 2017  (DE) .................. 10 2017 203 741.5

(51) Int. Cl.
*B25J 9/10* (2006.01)
*G05G 5/04* (2006.01)

(52) U.S. Cl.
CPC .................................. *B25J 9/101* (2013.01)

(58) Field of Classification Search
CPC .... B25J 9/101; F16D 23/06; F16H 2035/006; G05G 5/04
See application file for complete search history.

(56) References Cited

U.S. PATENT DOCUMENTS 3,260,375 A * 7/1966 Lemelson ................ B25J 9/101
  414/728
3,419,158 A * 12/1968 Lemelson ................ B25J 9/101
  414/728

(Continued)

FOREIGN PATENT DOCUMENTS

DE  3721274 A1  1/1989
DE  4203663 A1  8/1992

(Continued)

OTHER PUBLICATIONS

European Patent Office; Search Report and Written Opinion in related International Patent Application No. PCT/EP2018/055489 dated May 24, 2018; 11 pages.

(Continued)

*Primary Examiner* — Tinh Dang
(74) *Attorney, Agent, or Firm* — Dorton & Willis, LLP

(57) ABSTRACT

A robot arm includes a mechanical stop device having at least one counter-stop body having a shape, which, in interaction with a respective corresponding shape of a receptacle, is designed to retain the counter-stop body whenever the counter-stop body is inserted in one of a plurality of the receptacles. The receptacle retains the counter-stop body in both a circumferential direction and in a radial direction with respect to the axis of rotation of a swivel joint, in a form-fitting manner.

14 Claims, 6 Drawing Sheets

(56) References Cited

U.S. PATENT DOCUMENTS

| | | | | |
|---|---|---|---|---|
| 4,828,094 A | * | 5/1989 | Torii | B25J 19/0091 |
| | | | | 192/139 |
| 4,934,504 A | | 6/1990 | Torii et al. | |
| 5,193,658 A | * | 3/1993 | Tellden | B25J 9/101 |
| | | | | 192/138 |
| 2006/0224275 A1 | * | 10/2006 | Heldesjo | B25J 9/101 |
| | | | | 700/245 |

FOREIGN PATENT DOCUMENTS

| | | |
|---|---|---|
| DE | 3751450 T2 | 5/1996 |
| DE | 4203663 C2 | 7/2002 |
| DE | 60317335 T2 | 2/2008 |
| EP | 0241556 A1 | 10/1987 |
| EP | 2479009 A1 | 7/2012 |
| JP | S614682 A | 1/1986 |
| JP | 2006068886 A | 3/2006 |

OTHER PUBLICATIONS

German Patent Office; Search Report in related German Patent Application No. 10 2017 203 741.5 dated Nov. 10, 2017; 5 pages.

\* cited by examiner

ROBOT ARM COMPRISING A MECHANICAL STOP DEVICE

CROSS-REFERENCE TO RELATED APPLICATIONS

This application is a national phase application under 35 U.S.C. § 371 of International Patent Application No. PCT/EP2018/055489, filed Mar. 6, 2018 (pending), which claims the benefit of priority to German Patent Application No. DE 10 2017 203 741.5, filed Mar. 7, 2017, the disclosures of which are incorporated by reference herein in their entirety.

TECHNICAL FIELD

The invention relates to a robot arm comprising a plurality of links and a plurality of joints that connect the links such that the links can be adjusted relative to one another and of which at least one of the joints is formed as a pivot joint that connects a link that is immediately ahead and is associated with the pivot joint to a second link that is immediately downstream and is associated with the pivot joint such that the these links are pivotable relative to one another, wherein the pivot joint can be adjusted automatically by means of a motor of the robot arm and is limited in its maximum pivot angle by a mechanical stop device of the robot arm.

BACKGROUND

EP 2 479 009 B1 describes a pivoting device, comprising a case, a pivot member configured to rotate relative to the case, and stopper configured to restrict a pivoting range of the pivot member relative to the case, wherein a plurality of grooves on the case extend in an axial direction of the pivot member, wherein the plurality of grooves is formed along a circular arc that has a center point that is coaxial with an axis of the pivot member and wherein a segment of the stopper is positioned into one of the grooves, wherein a first bolt hole, through which a bolt for fixing the case passes, is formed on each protrusion that defines two adjacent grooves, and wherein the stopper is fixed to the case by the bolts.

SUMMARY

The object of the invention is to provide a robot arm comprising a stop device in which device a counter-stop body of the stop device can be offset in a simple manner in order to be able to change a maximum pivot angle of a pivot joint of the robot arm in a safe and rapid manner.

The object of the invention is achieved using a robot arm comprising a plurality of links and a plurality of joints that connect the links such that the links can be adjusted relative to one another and of which at least one of the joints is formed as a pivot joint that connects a link that is immediately ahead and is associated with the pivot joint to a second link that is immediately downstream and is associated with the pivot joint such that these links are pivotable relative to one another, wherein the pivot joint can be adjusted automatically by means of a motor of the robot arm and is limited in its maximum pivot angle by a mechanical stop device of the robot arm, which stop device has at least one stop protrusion connected to the one link of the two links associated with the pivot joint and at least one counter-stop body waiting in a stop position on the stop protrusion, which counter-stop body is connected in a form-fitting manner in circumferential direction, relative to the pivot axis, to the other link of the two links associated with the pivot joint in that the counter-stop body is positioned in one of the plurality of receptacles of the other link arranged distributed across a circumferential arc, wherein the counter-stop body has a shape that, in cooperation with a corresponding shape of the receptacle, is designed to retain the counter-stop body in a form-fitting manner, when it is positioned in one of the plurality of receptacles, in the receptacle, both in the circumferential direction and in a radial direction with respect to the axis of rotation of the swivel joint.

Robots, in particular industrial robots, are working machines that can be equipped with tools for automatically handling and/or processing objects and that are programmable by means of their joints in a plurality of movement axes, for example, with respect to orientation, position, and work sequence. Robots generally have a robot arm comprising a plurality of joints (axes) that can be adjusted automatically, using electric drives in particular, or manually, and a programmable robot controller that controls or regulates the movement sequences of the robot during operation.

The robot can be a so-called articulated arm robot, the robot arm of which has a base frame as a link on which a rotating table is mounted pivotably around a vertical axis, as a trailing link, and is pivotally driven by means of a first drive motor. A link arm can be mounted on the rotating table as a further link and is pivotable up and down around a second horizontal axis and can be pivotally driven by means of a second drive motor. The link arm carries a boom arm that is mounted pivotable up and down around a third horizontal axis and is pivotally driven by means of a third drive motor. A fourth arm can be provided on the boom arm, the base arm of which forms a further link, and runs in the longitudinal extension of the boom arm and, via a fourth drive motor, drives a robot hand that forms a forearm of the boom arm and represents a further link. A first limb and a second limb can extend forward in a fork-like shape from the robot hand. The two limbs carry a bearing for a free end of the robot hand that forms a next-to-last link. The bearing defines a fifth axis of the robot arm, around which the robot hand can be pivotably moved by means of a fifth drive motor. In addition, the robot hand can have a sixth axis around which a tool attaching flange, forming a last link, can be pivotally driven by means of a sixth drive motor.

Each of the joints can be formed as a rotary joint. Each link is formed to transmit forces and moments, in particular those from a gripper or a tool which is handled, or in particular moved by the robot, introduced through a tool mounting flange of the robot arms into the robot arm, i.e. into its structure, from one joint to the next joint. In addition, forces and moments which originate in the dead weight force of the robot arm must be transmitted into the base frame of the robot arm. Each link of the robot arm has for this purpose at least one structural part which is formed to be able to assume these forces and moments and to transmit them. In general, such a structural part is formed hollow and can for example consist of a metal casting or a welded steel construction, which can for example have tubular sections. Each link is connected, particularly connected in rotation, with an immediately following link of the robot arms through one of the joints. For this purpose, the respective joint can have a pivot bearing. On each joint, respective each pivot bearing, an individual motor, such as for example an electric motor, in particular a servo motor, can be coupled, for automatic driving, with the associated drive control. The drives are generally controlled by a robot controller of the robot. Due to the robot controller, the joints can be automated by means of the drives according to a robot program or be adjusted in a manual drive control operation of the robot, in order to change the configuration of the robot arm. What is meant by configuration is the set of momentary, individual axis angle positions of the joints of the robot arm.

The mechanical stop device limits the maximum pivot angle of an associated joint of the robot arm independently from the automatic and/or programmed control of the robot arm by means of the robot controller. In this respect, the mechanical stop device forms a mechanical safety device. The mechanical stop device can generally be formed on an arbitrary joint or on a plurality of joints of the robot arm. The mechanical stop device can in particular be formed on a base joint of the robot arm, in particular on a joint connecting the base frame of the robot arm with a carousel of the robot arm.

The mechanical stop device can have a first stop position operating in a first pivot direction of the joint of the robot arm comprising the mechanical stop device and have a second stop position operating in an opposite pivot direction. In this connection, the stop protrusion can have two opposite stop faces facing away from one another, in such a manner than in the first stop position the one stop face of the stop protrusion is located at a first stop body of the mechanical stop device, when the maximum pivot angle in the pivot direction is reached, and that in the second stop position the other stop face of the stop protrusion is positioned at a second stop body of the mechanical stop device, if the maximum pivot angle in the opposite pivot direction is reached. By reconnecting the first stop body, the maximum pivot angle in the pivot direction can be changed. By reconnecting the second stop body, the maximum pivot angle in the opposite pivot direction can be changed.

Inasmuch as the counter-stop body has a shape which, in cooperation with a respective corresponding shape of the receptacle, is formed to retain the counter-stop body, if it is positioned at any of the plurality of receptacles, both in the circumferential direction as well as in the radial direction with respect to the axis of rotation of the pivot joint, in the receptacle in which it is positioned in a form-fitting manner, the respective maximum pivot angle of the associated joint which has the mechanical stop device can, in a particularly user-friendly way, be easily and rapidly changed, respectively set. This eases the assembly and the setting of the robot arm at its operating location.

The form-fitting connection profile of an individual counter-stop body and the individual form-fitting connection profile of the respective receptacle, in which the counter-stop body can be positioned, can be formed in such a manner that only due to the shape of the form-fitting connection profile of the counter-stop body in the receptacle in use of the plurality of receptacles positioned distributed over a circumferential arch of the other link of the robot arm, is retained in the receptacle in a form-fitting manner, both in the circumferential direction and in the radial direction with respect to the pivot axis of the pivot joint. Such a form-fitting retention can occur, due to the respective shape of the form-fitting connection profile and of the form-fitting connection counter-profile, in particular with no separate and/or additional retention means. An individual counter-stop body can accordingly, solely due to the shape of the form-fitting connection profile and the shape of the form-fitting connection counter-profile in an individual receptacle, be retained in the receptacle in a form-fitting manner, both in the circumferential direction as well as in the radial direction with respect to the pivot axis of the pivot joint. In particular, only a single counter-stop body for each pivot direction can be present, which is optionally positioned in a single receptacle of a plurality of receptacles. The respective receptacle can be formed, in a positioned state of the counter-stop body, to envelop, or respectively mechanically contact in a form-fitting manner, the counter-stop body from at least three sides of the counter-stop body.

Inasmuch as the counter-stop body has a shape, which in cooperation with a respective corresponding shape of the receptacle is formed to retain the counter-stop body, if it is positioned in one of the plurality of receptacles, in the receptacle in which it is positioned, in a form-fitting manner, both in the circumferential direction and in the radial direction with respect to the pivot axis of the pivot joint, the respective counter-stop body to be implemented can, by simple insertion in the axial direction with respect to the pivot axis of the joint which has the mechanical stop device, be positioned in the receptacle or positioned at the receptacle, and by simple extraction in the axial direction with respect to the pivot axis of the joint which has the mechanical stop device, be withdrawn from the receptacle or moved away from the receptacle.

The counter-stop body can have a form-fitting connection profile operating form-fittingly both in the circumferential direction and in the radial direction with respect to the pivot axis of the pivot joint and the receptacles can as a result have a respective form-fitting connection counter-profile corresponding to the form-fitting connection profile of the counter-stop body.

The form-fitting connection profile and the form-fitting connection counter-profile are accordingly formed to lie flush against one another, in an assembled state, so that a flush form-fitting connection of the counter-stop bodies and the receptacle results.

The form-fitting connection profile of the counter-stop body and the form-fitting connection counter-profile of the receptacles can be formed for interlocking in an axial direction with respect to the pivot axis of the pivot joint.

This means that the form-fitting connection profile and the form-fitting connection counter-profile, considered in an axial cross section, are formed from a curved line which forms an undercut appearing in the circumferential and in the radial direction, wherein this curved line is then extended in the axial direction by in particular vertical or in particular skewed geometric extrusions into a volumetric profile surface, in order to form the form-fitting connection profile or the form-fitting connection counter-profile.

In this respect, the form-fitting connection profile and the form-fitting connection counter-profile can be formed from a portion of a shell surface of a general, straight and/or in particular vertical geometric cylinder.

Each receptacle can be formed from a cylinder pocket, the inner wall of which has the form-fitting connection counter-profile and here the counter-stop body can have a protrusion, the outer wall of which has the form-fitting connection profile.

In this first embodiment the counter-stop body and the selected receptacle pocket interlock in such a manner that the protrusion of the counter-stop body is received in a form-fitting manner in the pocket of the receptacle. The pocket of the receptacle thus encompasses the protrusion of the counter-stop body.

The form-fitting connection profile and the corresponding form-fitting connection counter-profile can thus be formed in the manner of a dovetail connection or in the form of a Christmas-tree connection. In the case of the preceding exemplary embodiment, the form-fitting connection profile and the corresponding form-fitting connection counter-profile can alternatively also be formed in the manner of a simplified dovetail connection profile. The form-fitting connection counter-profile can thus be formed in the manner of a protrusion with a T-shaped cross section. What matters in the shape of the form-fitting connection profile and corresponding form-fitting connection counter-profile is only that a head section of the protrusion extended transverse to the radial direction, i.e. in the circumferential direction over a connection section of the protrusion narrowed transverse to the radial direction, i.e. in the circumferential direction, is connected to a base body of the counter-stop body.

Each receptacle can be formed from a protrusion, the outer wall of which has the form-fitting connection counter-profile and the counter-stop body can thus have a receptacle pocket, the inner wall of which has the form-fitting connection profile.

In this second embodiment, the counter-stop body and the selected receptacle interlock in such a manner, that the protrusion of the receptacle is received in a pocket of the counter-stop body in a form-fitting manner. The pocket of the counter-stop body thus encompasses the protrusion of the selected receptacle.

The form-fitting connection profile and the corresponding form-fitting connection counter-profile can thus be formed in the manner of a dovetail connection or in the manner of a Christmas-tree connection. In the case of the preceding exemplary embodiment, the form-fitting connection profile and the corresponding form-fitting connection counter-profile can alternatively also be formed in the manner of a simplified dovetail connection profile. The form-fitting connection profile and the corresponding form-fitting connection counter-profile can thus be formed in the manner of a protrusion with a T-shaped cross section. What matters in the shape of the form-fitting connection profile and the corresponding form-fitting connection counter-profile is only that a head section of the protrusion is extended transverse to the radial direction, i.e. in the circumferential direction above a connection section of the protrusion narrowed transverse to the radial direction, i.e. in the circumferential direction is connected with a base ring of the receptacle, respectively a supporting arch comprising a plurality of receptacles.

The form-fitting connection profile and the corresponding form-fitting connection counter-profile can accordingly therefore be formed in the manner of a dovetail connection or a Christmas-tree connection.

The plurality of receptacles or receptacle pockets positioned distributed over a circumferential arch can be formed on a supporting arch separate from the other link of the robot arm, in particular from a base frame of the robot arm, and the supporting arch can thus be attached by releasable attachment means to the other link of the robot arm.

The supporting arch can have the form of a partial circular ring. The receptacles or receptacle pockets are then formed on one inside shell wall of the supporting arch. This means that the receptacle or receptacle pocket can be formed from indentations respectively cavities on the inside shell wall of the supporting arch. In each case one counter-stop body can thus be positioned in an arbitrary, i.e. desired for the determination of the maximum pivot angle, receptacle pocket, in such a manner that the counter-stop body projects from the inside shell wall of the supporting arch directed away to the inside toward the center.

The releasable attachment means can for example be formed from threaded holes introduced at the other link of the robot arm, in particular at the base frame, through holes introduced in an aligned manner in the supporting arch separate screws allocated to them, by which screws the supporting arch can be releasably tightly screwed to the other link of the robot arm, in particular to the base frame.

The supporting arch can essentially extend at least over 270 degrees of a circular arc, and have in all 16 or 18 receptacles arranged at equal intervals from one another and distributed evenly over the supporting arch.

Inasmuch as the supporting arch, which essentially extends over 270 degrees of a circular arc, has for example 18 receptacles or receptacle pockets arranged at equal intervals from one another and distributed evenly over the supporting arch, an angular division of 15 degrees is obtained.

If in addition each counter-stop body is positionable in the respective receptacle or receptacle pocket in the axial direction with respect to the pivot axis of the pivot joint and in a first mounting orientation, as also positionable in a second mounting orientation, turned with respect to the first mounting orientation, and the counter-stop body has a first stop wall, which is formed to line up at the stop protrusion in a first pivot direction of the pivot joint in a first stop position of the stop device and has a second stop wall opposite the first stop wall, which is formed to line up at the stop protrusion in a direction opposite to the first pivot direction of the pivot joint in a second stop position of the stop device, wherein the first stop wall is arranged relative to the mirror symmetry plane of the form-fitting connection profile at a first offset angle of for example 5 degrees offset to the counter-stop body and the second stop protrusion is arranged relative to the mirror symmetry plane of the form-fitting connection profile at a second offset angle of for example 10 degrees in the circumferential direction offset to the counter-stop body, then the angular division of 15 degrees can be reduced to an angular division of 5 degrees.

For this purpose the receptacle or receptacle pocket to be used which is closest to the needed or desired maximum pivot angle can be selected for the counter-stop body, and then which mounting orientation the counter-stop body is positioned in the selected receptacle or receptacle pocket can be selected, in order to optionally be able to add 5 degrees or 10 degrees, depending on the mounting orientation of the counter-stop body, in addition to the angular setting of the selected receptacle or receptacle pocket. Thus an angular division of 5 degrees results on the supporting arch.

The supporting arch, which essentially extends over 270 degrees of a circular arc, can have, instead of the 18 receptacles or receptacle pockets mentioned, for example only 16 receptacles or receptacle pockets at equal intervals from one another and arranged distributed evenly over the supporting arch, without losing the angular division of 15 degrees, as in this case the receptacles or receptacle pockets can be arranged at the same distances from one another, as in the division into 18 receptacles or receptacle pockets, wherein however only the two endwise receptacles or receptacle pockets on the supporting arch are omitted.

The stop device can have a separate cover plate which is formed to close off the plurality of receptacles or receptacle pockets arranged distributed over a circumferential arch, and/or the supporting arch which has the plurality of receptacles or receptacle pockets arranged distributed over a circumferential arch, from an axial face side, if the cover plate is releasably connected to the other link of the robot arm or to the supporting arch.

Due to the feature that the counter-stop bodies must be positionable in the axial direction in the receptacles or receptacle pockets, it requires, in addition to the shape of the form-fitting connection profile and the form-fitting connection counter-profile, yet another axial determination in order to fix the counter-stop body in all three spatial directions. At one bottom side, respectively at one face side referring in the axial direction to the assigned link of the robot arm, the receptacles or receptacle pockets can be confined by a bottom or by an outside wall of the assigned link, whereby an axial insertion and axial extraction of the respective counter-stop body from the other axial face side is accomplished. This inherently axial face side open to axial insertion and axial extraction is closed off by the separate cover plate, if the counter-stop bodies are positioned in the desired receptacles or receptacle pockets. By means of the attached, in particular screwed cover plate, the positioned counter-stop bodies are finally completely fixed in all spatial directions. Each receptacle or receptacle pocket can thus be closed off by an individual plate. It is however more advantageous, because it is less costly in assembly, to provide a single common cover plate for a plurality of receptacles or receptacle pockets, particularly for all available receptacles or receptacle pockets.

The form-fitting connection profile of the counter-stop body can be formed with mirror symmetry, in such a manner that the counter-stop body can be inserted into the respective receptacle or receptacle pocket in the axial direction with respect to the pivot axis of the pivot joint both in a first mounting orientation and in a second mounting direction turned from the first mounting orientation in the respective receptacle or receptacle pocket.

Thus that receptacle or receptacle pocket which is closest to the needed or desired maximum pivot angle, can first be selected for positioning for the counter-stop body that is reversible in this manner, and then the mounting orientation of the counter-stop body can be selected in which it will be positioned in the selected receptacle or receptacle pocket, in order to be able to add for example 5 degrees or 10 degrees, depending on the mounting orientation of the counter-stop body, in addition to the angular position of the selected receptacle or receptacle pocket. Thus a correspondingly finer angular division results on the supporting arch.

The counter-stop body can have a first stop wall which is formed to line up at the stop protrusion in a first pivot direction of the pivot joint in a first stop position of the stop device and can have a second stop wall opposite the first stop wall which is formed to line up at the stop protrusion in a pivot direction opposite to the first pivot direction of the pivot joint in a second stop position of the stop device, wherein the first stop wall is arranged offset to the counter-stop body at a first offset angle relative to the mirror-symmetry plane of the form-fitting connection profile and the second stop protrusion is arranged offset to the counter-stop body in the circumferential direction at a second offset angle, the value of which differs from the value of the first offset angle, relative to the mirror-symmetry plane of the form-fitting connection profile.

The second offset angle of the second stop wall can be twice as large in value as the value of the first offset angle of the first stop wall.

The link ahead of the pivot joint can be a base frame of the robot arm and the link following the pivot joint can then be a carousel of the robot arm.

A concrete exemplary embodiment of the invention is described in detail in the following description, with reference to the appended figures. Concrete features of this illustrative exemplary embodiment can represent general features of the invention regardless of in which concrete context they are mentioned, if applicable considered also individually or in other than the combinations shown.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
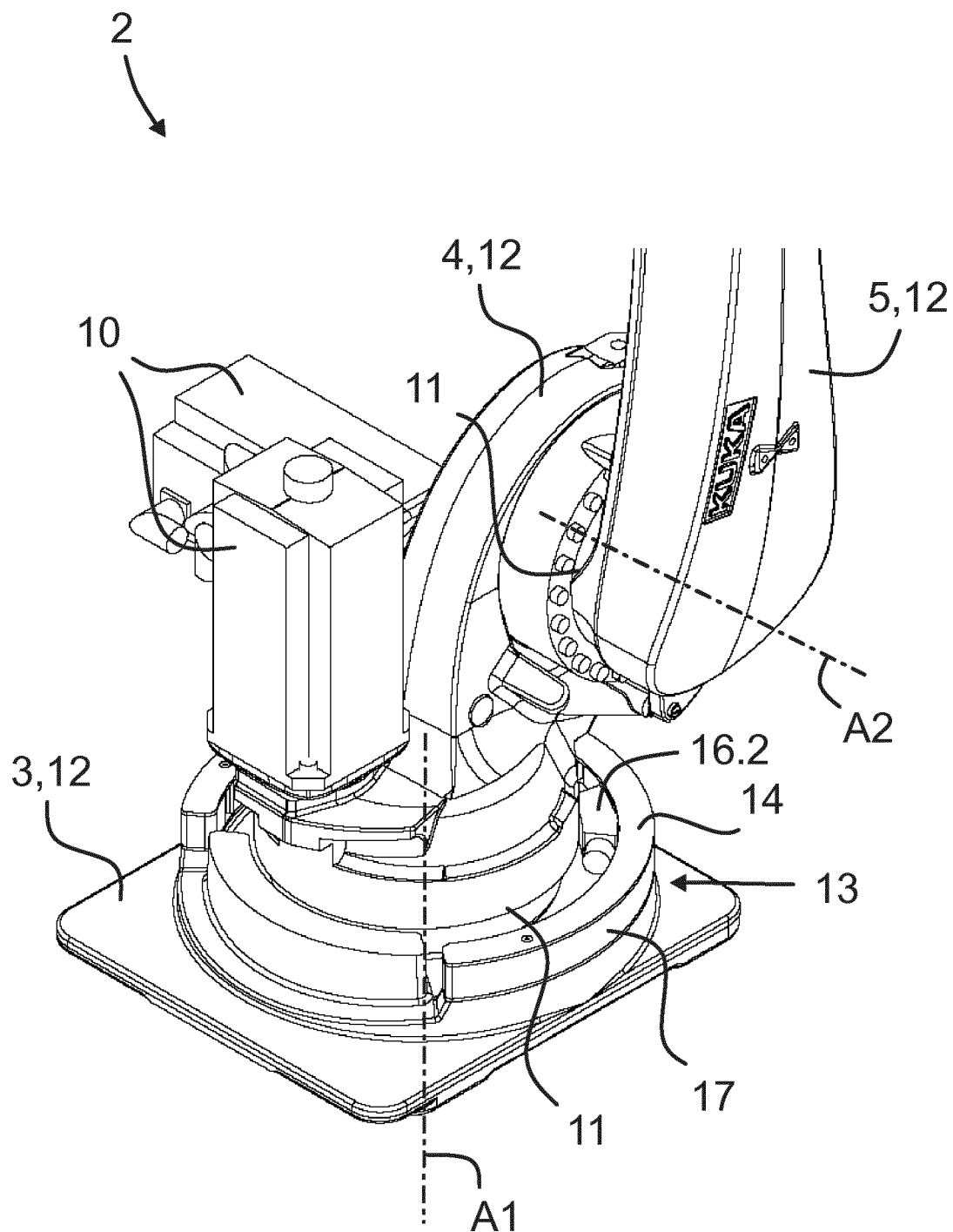
FIG. 1 is a partial perspective view of an exemplary robot arm including an exemplary mechanical stop device on its first pivot joint, which connects in rotation a base frame of the robot arm with a carousel of the robot arm.
Figure 2:
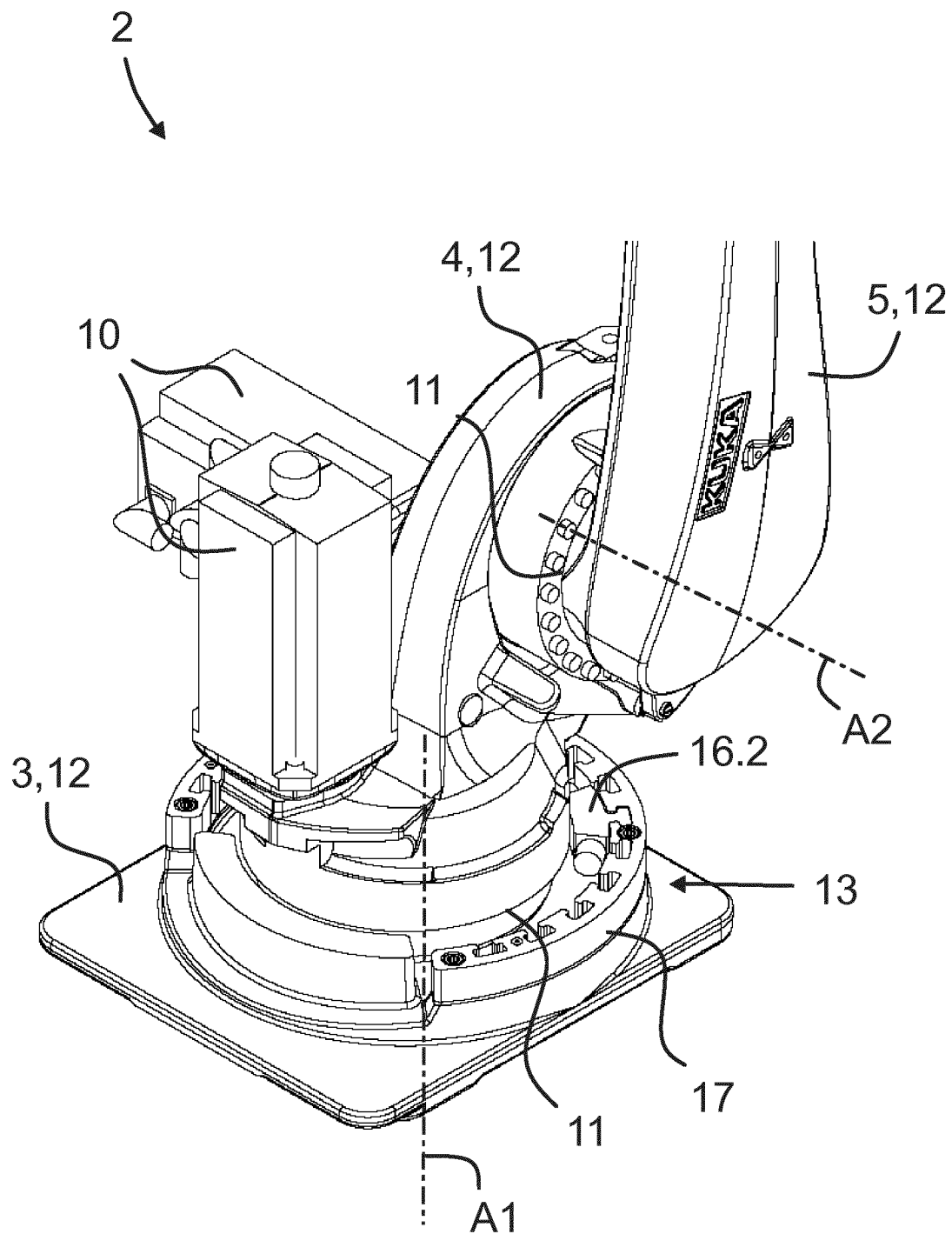
FIG. 2 is a partial perspective view of the robot arm according to FIG. 1 in which a separate cover plate of the exemplary mechanical stop device is removed, so that the plurality of receptacles of the stop device are accessible.

FIG. 1 and FIG. 2 show a portion of a robot arm 2. The robot arm 2 includes, in the case of the present exemplary embodiment, a plurality of successively arranged links 12 connected by joints 11. The links 12 are particularly a base frame 3 and a carousel 4 equipped with pivot bearings, pivotable relative to the base frame 3 around a vertically running axis A1. Additional links 12 of the robot arm 2 are, in the case of the present exemplary embodiment, a link arm 5 and other links, not shown, which can be for example a boom arm and a preferably multi-axial robot hand with an attachment device implemented as a flange for attaching an end effector, i.e. a tool. The link arm 5 is equipped with a bearing to pivot around a preferably horizontal rotation axis A2 on the carousel 4.

Accordingly, the robot 1 has a robot controller and the robot arm 2 with a plurality of joints 11 connected by the links 12, which are adjustable by motors 10 of the robot arm 2 which are coupled to the joints, according to one of the robot programs implemented by the robot controller, or adjustable in a manual drive control operation of the robot in order to change the configuration of the robot arm 2.

For mechanically constraining a maximum pivot angle of the carousel 4 relative to the base frame 3, the robot arm 2 has an inventive mechanical stop device 13.

Figure 3:
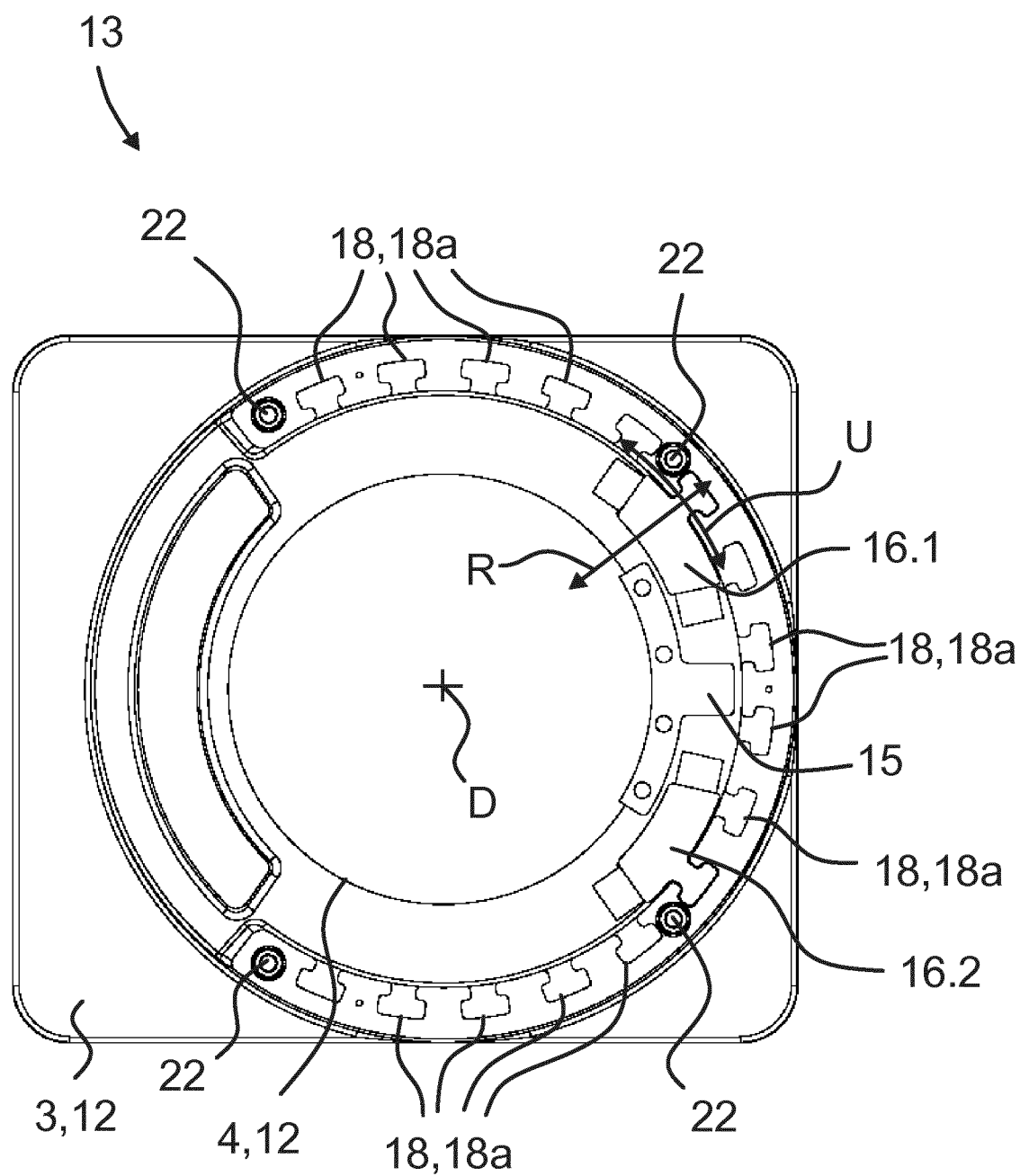
FIG. 3 is a schematic top view of the plurality of receptacles of the stop device on the base frame of the robot arm.

FIG. 2 and FIG. 3 show, with the cover plate 14 removed, the inner construction of the mechanical stop device 13.

The mechanical stop device 13 of the robot arm 2 has, in the case of the present exemplary embodiment, a stop protrusion 15 connected to the carousel 4, a first counter-stop body 16.1 lined up in one pivot direction at the stop protrusion 15 and a second counter-stop body 16.2 lined up in the other pivot direction at the stop protrusion 15. Each of the two counter-stop bodies 16.1 and 16.2 is connected in a form-fitting manner with the base frame 3 in the circumferential direction, in that the respective counter-stop body 16.1 and 16.2 is inserted at one of the plurality of receptacles 18 of the base frame 3 arranged distributed over a circumferential arch 17.

Here the respective counter-stop body 16.1 and 16.2 has a shape which is formed in cooperation with a respective corresponding shape of the receptacle 18, to retain the counter-stop body 16.1 and 16.2 in the receptacle in which it is inserted, in a form-fitting way, if it is inserted into one of the plurality of receptacles 18, both in the circumferential direction U and in the radial direction R with respect to the pivot axis D of the pivot joint.

The respective counter-stop body 16.1 and 16.2 has a form-fitting connection profile operating in a form-fitting manner both in the circumferential direction U and in the radial direction R with respect to the pivot axis D of the pivot joint and the receptacles 18 respectively have a form-fitting connection counter-profile corresponding to the form-fitting connection profile of the counter-stop bodies 16.1 and 16.2.

Figure 5:
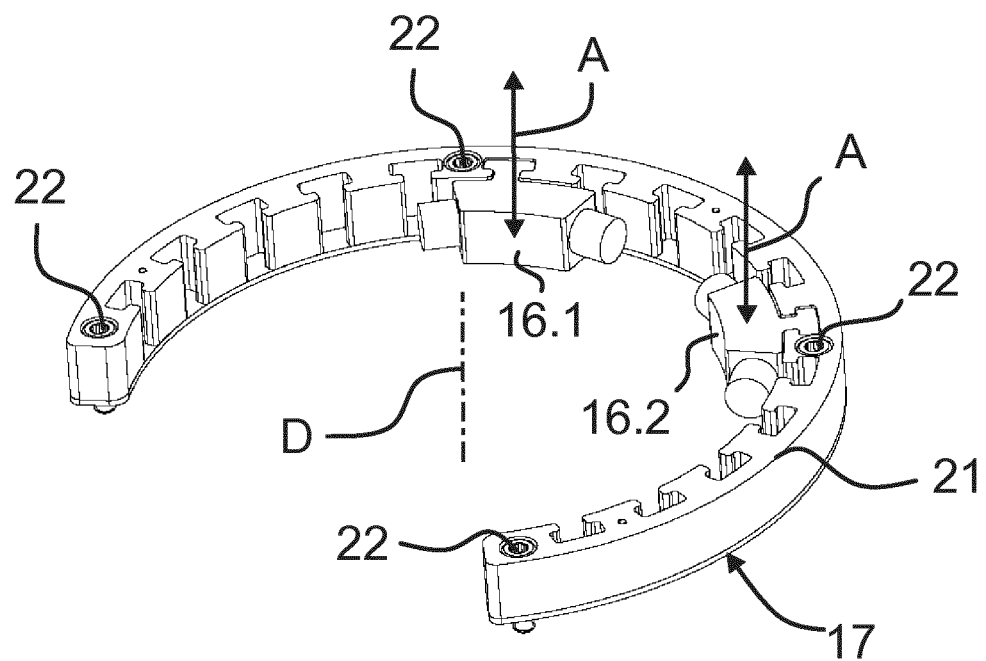
FIG. 5 is a perspective view of a supporting arch, which has the plurality of receptacles or receptacle pockets with two inserted counter-stop bodies, with the cover plate removed.

The form-fitting connection profile of the counter-stop body 16.1 and 16.2 and the form-fitting connection counter-profile of the receptacles 18 are formed for interlocking in an axial direction A with respect to the pivot axis D of the pivot joint, as illustrated in particular in FIG. 5, if the cover plate 14 is removed.

Figure 7:
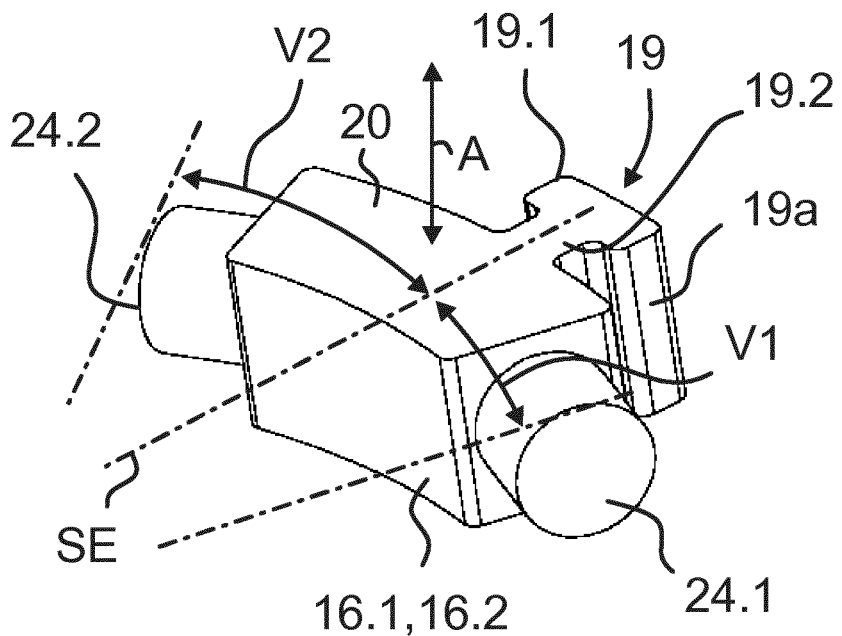
FIG. 7 is a perspective view of a single counter-stop body in a usable first orientation.
Figure 8:
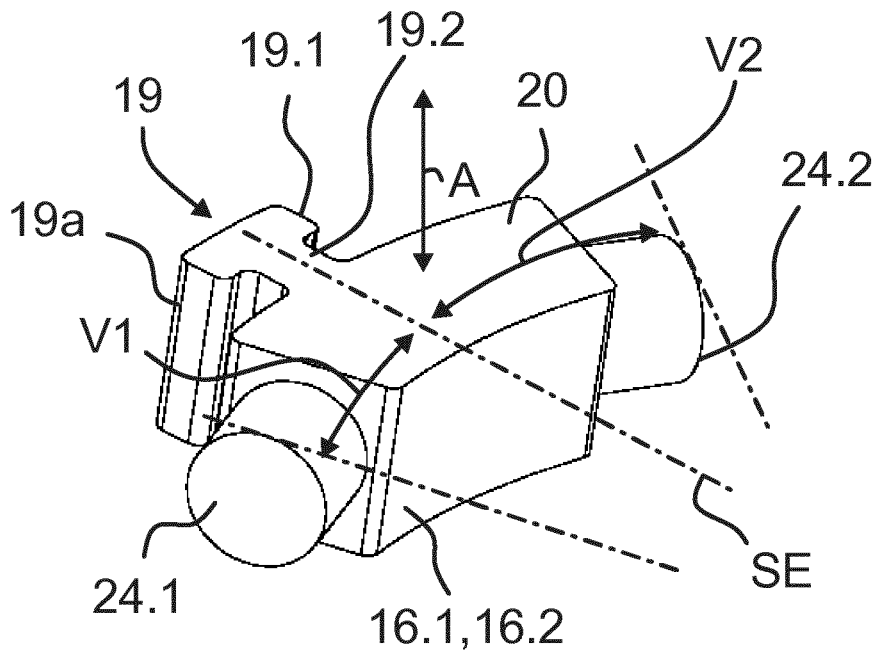
FIG. 8 is a perspective view of a single counter-stop body in a usable second orientation, in which the counter-stop body is reversed with respect to its orientation according to FIG. 7.

Each receptacle 18 is, in the case of the present exemplary embodiment formed from a receptacle pocket 18a, the inner wall of which has the form-fitting connection counter-profile and in this case the counter-stop body 16.1 and 16.2 has a protrusion 19, the outer wall 19a of which has the form-fitting connection profile, as can be seen in particular in FIG. 7 and FIG. 8.

The form-fitting connection profile and the corresponding form-fitting connection counter-profile can be formed in the manner of a dovetail connection or in the manner of a Christmas-tree connection. In the case of the present exemplary embodiment, the form-fitting connection profile and the corresponding form-fitting connection counter-profile are formed in the manner of a simplified dovetail connection profile.

In the case of the present exemplary embodiment the form-fitting connection profile and the corresponding form-fitting connection counter-profile are formed in the manner of a protrusion 19 with a T-shaped cross section. In the shape of the form-fitting connection profile and the corresponding form-fitting connection counter-profile, a head section 19.1 of the protrusion 19 is extended transversely to the radial direction R, i.e. in the circumferential direction, above a connection section 19.2 of the protrusion 19 narrowed transversely to the radial direction R, i.e. in the circumferential direction and is connected with a base body 20 of the counter-stop body 16.1 and 16.2 respectively with a base ring 21 of the supporting arch 17.

In the case of the present exemplary embodiment, the plurality of receptacles 18 or receptacle pockets 18a arranged distributed over a circumferential arch are formed on a supporting arch 17 separate from the base frame 3 of the robot arm 2 and the supporting arch 17 is attached to the base frame 3 of the robot arm 2 by means of releasable attachment means 22. The releasable attachment means 22 can be formed for example from threaded holes introduced into the base frame 3, through holes introduced flush with the supporting arch 17, separate screws allocated to them, by which screws the supporting arch 17 can releasably be firmly screwed to the base frame 3.

Figure 6:
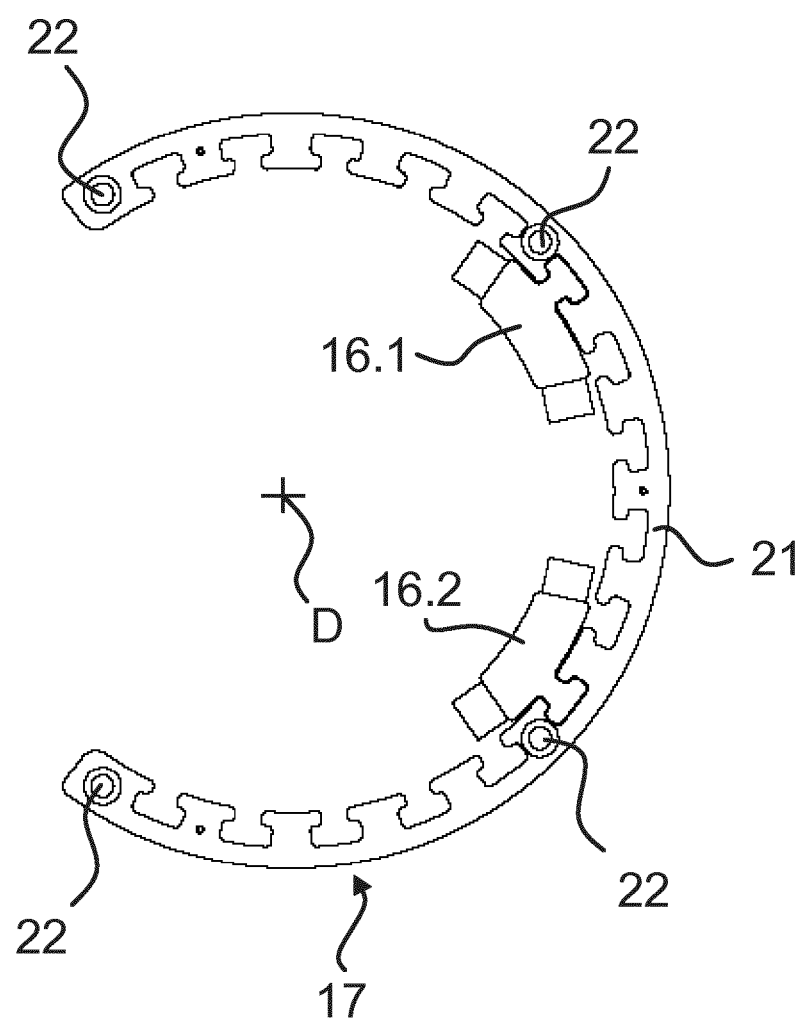
FIG. 6 is a schematic top view of the supporting arch, which has the plurality of receptacles or receptacle pockets of the stop device and into which are inserted two mirror-symmetrically formed counter-stop bodies.

FIG. 6 in particular shows how the supporting arch 17 essentially extends over at least 270 degrees of a circular arc and, in the case of the present exemplary embodiment, has in all 14 receptacles 18 or receptacle pockets 18a at equal intervals from one another and arranged evenly described over the supporting arch 17.

Figure 4:
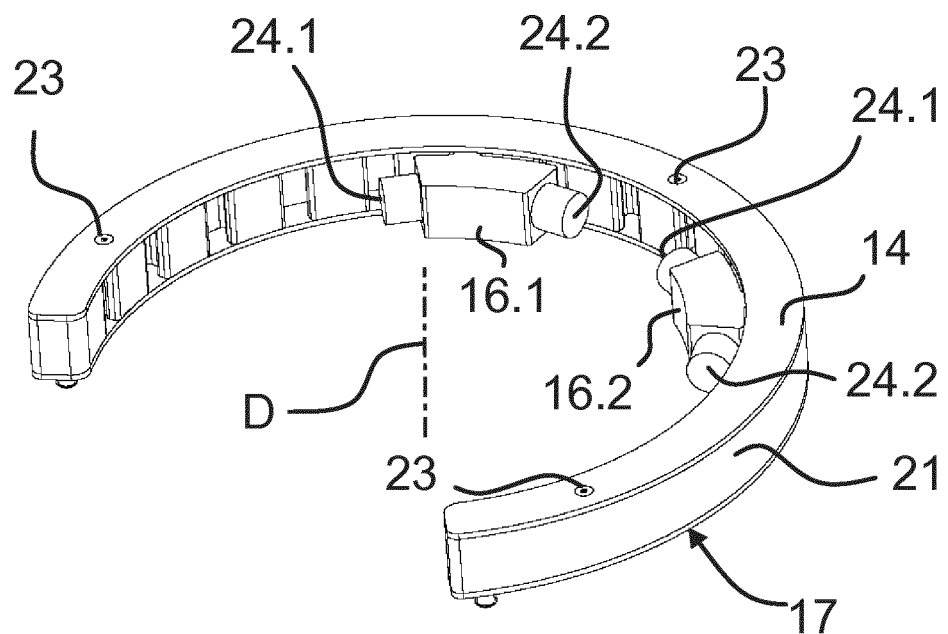
FIG. 4 is a perspective view of a supporting arch, which has the plurality of receptacles or receptacle pockets of the stop device with two inserted counter-stop bodies and one attached cover plate.

The separate cover plate 14 is formed to close off the plurality of receptacles 18 or receptacle pockets 18a arranged distributed over a circumferential arch, i.e. the supporting arch 17 which has the plurality of receptacles 18 or receptacle pockets 18a arranged distributed over a circumferential arch from an axial face side, if the cover plate 14, as shown in particular in FIG. 4, is releasably attached to the supporting arch 17 by means of additional attachment means 23. The releasable attachment means 23 can for example be formed from threaded holes introduced into the supporting arch 17, through holes introduced flush into the cover plate 14 and separate screws allocated to them, by which screws the cover plate 14 can releasably be firmly screwed to the supporting arch 17.

FIG. 7 and FIG. 8 illustrate how the form-fitting connection profile of the counter-stop body 16.1 and 16.2 is formed with mirror symmetry, in such a manner that the counter-stop body 16.1, 16.2 is insertable in the axial direction A with respect to the pivot axis D of the pivot joint both in a first mounting orientation (FIG. 7) into the respective receptacle 18 or receptacle pocket 18a, or in a second mounting orientation (FIG. 8) turned with respect to the first mounting orientation (FIG. 7) in the respective receptacle 18 or receptacle pocket 18a. Thus FIG. 5 shows for example two identically formed counter-stop bodies 16.1 and 16.2, wherein the counter-stop body 16.1 seen in FIG. 5 at roughly a twelve o'clock position in an orientation according to FIG. 8, is inserted into one of the receptacles 18 or receptacle pockets 18a and the counter-stop body 16.2 seen in FIG. 5 at roughly a three o'clock position in a turned orientation according to FIG. 7 is inserted into one of the receptacles 18 or receptacle pockets 18a.

FIG. 7 in particular shows clearly in comparison with FIG. 8 how the counter-stop bodies 16.1 and 16.2 have a first stop wall 24.1, which is formed to line up with the stop protrusion 15 in a first pivot direction of the pivot joint in a first stop position of the stop device 13 and have a second stop wall 24.2 opposite the first stop wall 24.1 which is formed to line up with the stop protrusion 15 in a pivot direction opposite to the first pivot direction of the pivot joint in a second stop position of the stop device 13, wherein the first stop wall 24.1 is arranged with an offset in the circumferential direction with respect to the counter-stop body 16.1 and 16.2 relative to the mirror symmetry plane SE of the form-fitting connection profile by a first offset angle V1 and the second stop protrusion 24.2 is arranged with an offset in the circumferential direction with respect to the counter-stop body 16.1 and 16.2 relative to the mirror symmetry plane SE of the form-fitting connection profile by a second offset angle, the value of which differs from the value of the first offset angle V1.

In the case of the present exemplary embodiment, the second offset angle V2 of the second stop wall 24.2 is twice as large in value as the value of the first offset angle V1 of the first stop wall 24.1.

The support arch 17 can extend over an angle of up to approximately 360 degrees. For the case in which the stop protrusion 15 is a portion of a trailing stop, even angles greater than 360 degrees, particularly up to approximately 370 degrees or up to approximately 380 degrees can be reached. It is understood that the configuration of a nearly arbitrary constraint of the supporting arch 17 angle allows from approximately 10 degrees to approximately 360 degrees.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot arm, comprising:
a plurality of links and a plurality of joints connecting the links such that the links can be adjusted relative to one another, wherein at least one of the joints is formed as a pivot joint that connects a first link that is located immediately ahead of and is associated with the pivot joint to a second link that is located immediately downstream of and is associated with the pivot joint, such that the first and second links are pivotable relative to one another about a pivot axis;
wherein the pivot joint can be adjusted automatically by a motor of the robot arm and is limited in its maximum pivot angle by a mechanical stop device of the robot arm;
the mechanical stop device comprising:
at least one stop protrusion connected to the first link, and
at least one counter-stop body selectively located proximate at least one stop position relative to the stop protrusion;
a plurality of receptacles associated with the second link and arranged distributed along a circumferential arc;
the at least one counter-stop body selectively positionable relative to the second link along a circumferential direction with respect to the pivot axis by coupling the counter-stop body with one of the receptacles to thereby define the stop position;
wherein the counter-stop body has a shape that cooperates with a corresponding shape of the plurality of receptacles, and is configured to retain the counter-stop body in a form-fitting manner within one of the receptacles when positioned therein, both in the circumferential direction and in a radial direction with respect to the pivot axis.

2. The robot arm of claim 1, wherein:
the at least one counter-stop body has a form-fitting connection profile operating in a form-fitting manner both in the circumferential direction and in the radial direction with respect to the pivot axis of the pivot joint; and
the respective receptacles have a form-fitting connection counter-profile corresponding to the form-fitting connection profile of the counter-stop body.

3. The robot arm of claim 2, wherein the form-fitting connection profile of the counter-stop body and the form-fitting connection counter-profile of the receptacles are configured for interlocking along an axial direction with respect to the pivot axis.

4. The robot arm of claim 2, wherein:
each receptacle is formed from a receptacle pocket, the receptacle pocket having an inner wall which includes the form-fitting connection counter-profile; and
the counter-stop body includes a protrusion, the protrusion having an outer wall which includes the form-fitting connection profile.

5. The robot arm of claim 2, wherein:
each receptacle is formed from a protrusion, the protrusion having an outer wall which includes the form-fitting connection counter-profile; and
the counter-stop body has a receptacle pocket, the receptacle pocket having an inner wall of which includes the form-fitting connection profile.

6. The robot arm of claim 2, wherein the form-fitting connection profile and the corresponding form-fitting connection counter-profile are configured as a dovetail-shaped connection or a Christmas tree-shaped connection.

7. The robot arm of claim 1, further comprising a supporting arch selectively, releasably attachable to the second link;
wherein the plurality of receptacles are formed on the supporting arch.

8. The robot arm of claim 4, further comprising a supporting arch selectively, releasably attachable to the second link;
wherein the receptacle pockets are formed on the supporting arch.

9. The robot arm of claim 7, wherein the supporting arch extends over at least 270 degrees of a circular arc and includes 16 or 18 receptacles arranged at equal intervals from one another and distributed evenly over the supporting arch.

10. The robot arm of claim 1, further comprising:
a cover plate selectively, releasably attachable to the robot arm and configured to close off an axial face side of the plurality of receptacles in an attached condition of the cover plate.

11. The robot arm of claim 2, wherein the form-fitting connection profile of the at least one counter-stop body is configured with mirror symmetry such that the counter-stop body is insertable into a respective receptacle along the axial direction with respect to the pivot axis in a first mounting orientation, and also in a second mounting orientation turned from the first mounting orientation.

12. The robot arm according to claim 11, wherein the counter-stop body further comprises:
a first stop wall configured to align with the stop protrusion in a first stop position of the stop device in a first pivot direction of the pivot joint; and
a second stop wall opposite the first stop wall and configured to align with the stop protrusion in a second stop position of the stop device in a pivot direction opposite to the first pivot direction;
wherein the first stop wall is arranged offset with respect to the counter-stop body relative to a mirror symmetry plane of the form-fitting connection profile at a first offset angle in the circumferential direction; and wherein the second stop protrusion is arranged offset with respect to the counter- stop body relative to the mirror symmetry plane of the form-fitting connection profile at a second offset angle, wherein the magnitude of the second offset angle differs from the magnitude of the first offset angle in the circumferential direction.

13. The robot arm of claim 12, wherein the second offset angle of the second stop wall is twice as large in magnitude as first offset angle of the first stop wall.

14. The robot arm of claim 1, wherein the first link is a base frame of the robot arm, and the second link is a carousel of the robot arm.

* * * * *